May 25, 1965  A. J. HACKL  3,184,863
DEVICE FOR PROGRAMMED INSTRUCTION
Filed March 6, 1962  2 Sheets-Sheet 1
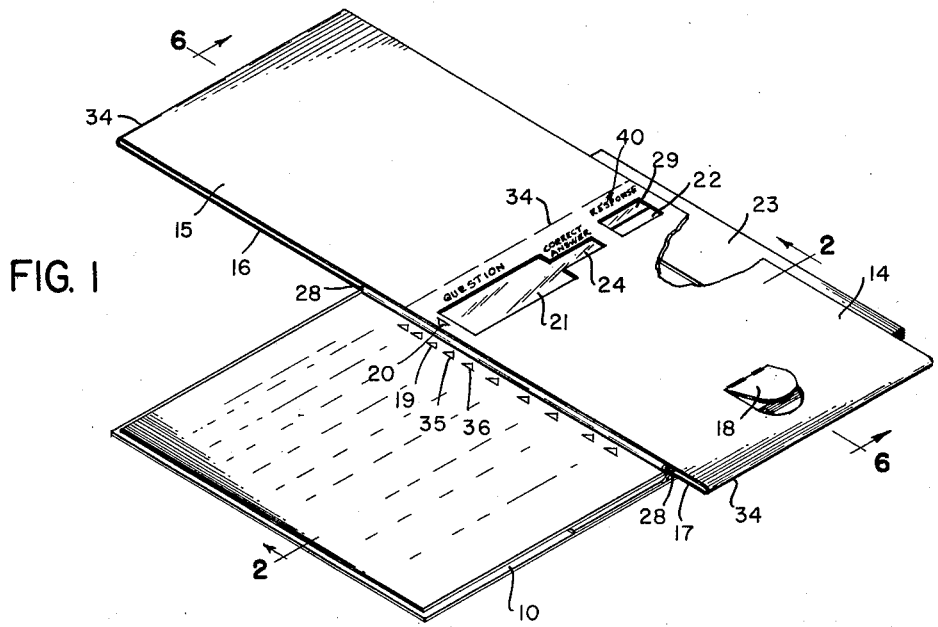
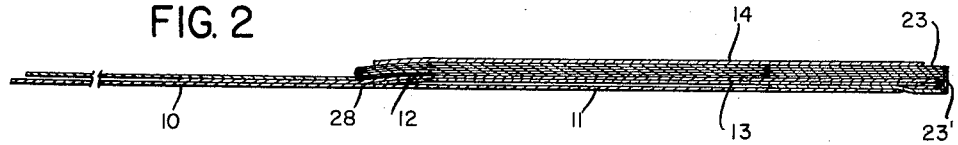
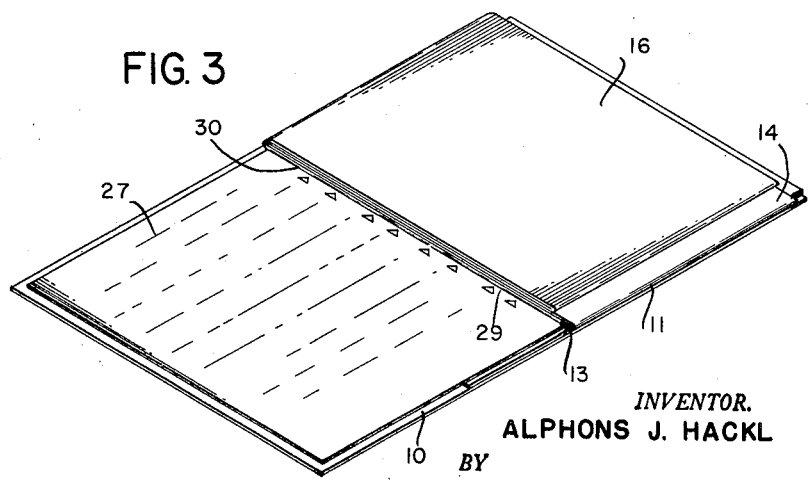
INVENTOR.
ALPHONS J. HACKL May 25, 1965 A. J. HACKL 3,184,863

DEVICE FOR PROGRAMMED INSTRUCTION

Filed March 6, 1962 2 Sheets-Sheet 2

*INVENTOR.*
ALPHONS J. HACKL
BY
Stevens, Davis, Miller & Mosher
Attorneys

United States Patent Office 3,184,863
Patented May 25, 1965

3,184,863
DEVICE FOR PROGRAMMED INSTRUCTION
Alphons J. Hackl, 3824 Legation St., Washington 15, D.C.
Filed Mar. 6, 1962, Ser. No. 177,767
1 Claim. (Cl. 35—9)

This invention relates to an educational device to facilitate programmed instruction and is commonly known as a teaching machine.

This invention relates to an inexpensive device adaptable to showing programmed educational material printed in economical book format. The device uses a movable mask with apertures. The mask is guided by a tongue in a flattened tubular channel in the back of the book so that the mask will move over the programmed material to expose portions of it in a prearranged sequence and one page after another.

The object of this invention is to furnish a simple device for the self-instruction of students to follow progressive and prearranged steps.

Another object is to provide storage for programs in book format.

Another object is to provide a work book or means whereby the student may read and then respond to one certain specific point which has been selected to fit into an educational program. After the student responds in writing or selecting a multiple choice answer the student is provided a correct written answer to the step to which he has responded. The specific answer at this time acts as a psychological reinforcement for the response which the material suggested. Each step and answer is presented in a single frame without being confused with other material or answers.

Another object is to provide encouragement for self-discipline. The student could violate the operative procedure in order to get the answer from the device. Though cheating is possible the device is not conducive to such action. The device is constructed so that even as pages of programmed material are turned there is a mask between the student and the answer.

Another object is to provide economy. A system of programmed material is simply and easily provided. The written responses are recorded by page. However the results for each page may be replaced so that the programmed material may be used again by another student.

The student places the mask over the programmed material, providing a written response to material that appears as questions in an aperture of the mask, then the student pulls the mask down to expose an answer in another aperture. The student simply pulls the mask a little further to expose another question in the aperture in which the first question appeared. The process is repeated for all the questions on the page, then the page of the book is turned to offer another page of material. The simplicity, economy and effectiveness of the presentation is considered of prime importance.

FIGURE 1 is a perspective view of the device opened and laid flat as on a table ready to use.

FIGURE 2 is a sectional view along the line 2—2 of FIGURE 1.

FIGURE 3 is a perspective view of the device opened as a book but with mask folded to cover apertures.

Figure 4:
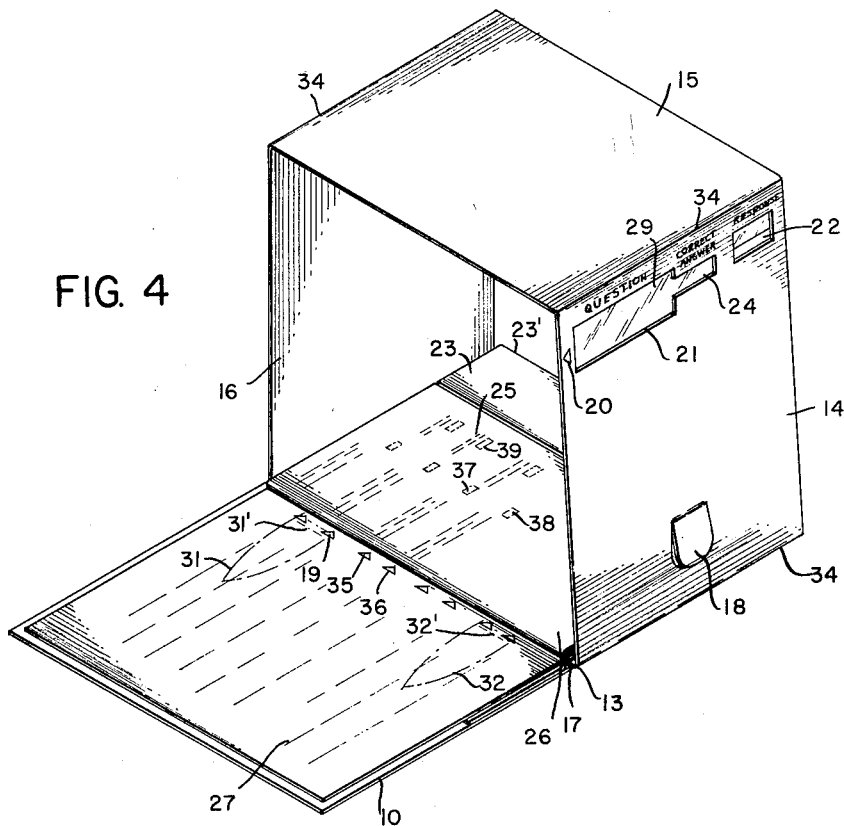
FIGURE 4 is a perspective view of the device with the mask raised from the book material with a sheet of the book material ready to be turned to the left.
Figure 5:
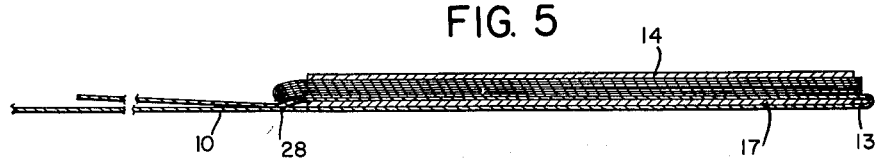
FIGURE 5 is a view similar to FIGURE 2 but without a replaceable pad.
Figure 6:
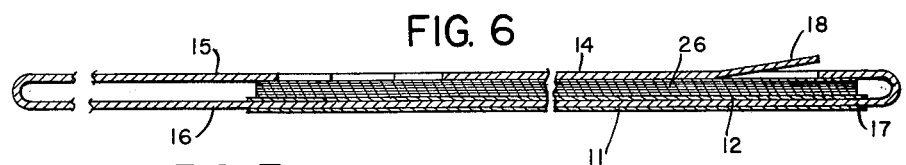
FIGURE 6 is a sectional view along the line 6—6 of FIGURE 1.
Figure 7:
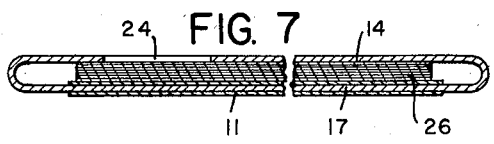
FIGURE 7 is a view similar to FIGURE 6 showing the use of rollable material for the loop.

Referring more particularly to the characters of reference on the drawings, 10 and 11 are each panels of flat material such as card board, plastic or other composition suitable for the cover for a book or pamphlet. 12 is another similar panel which lies parallel and close to 11. However 11 is either not cut at the edge parallel to the fold 28—28 between 11 and 12 or the edge of another sheet 12 of similar material is fastened to 11 along said edge so that the panel 12 lies flat on 11, to form a flat tubular channel 13 between 11 and 12. The edge of 12 parallel to the fold 28—28 may be fastened as by sewing or stapling at 29', 30. This tubular channel may be formed in other ways and be of different sizes to accommodate and fit a tongue of material such as the panel of card board, plastic or other materials. 14, 15, 16, 17 are each panels of card board, plastic or other material which are secured to the adjacent panel at their top and bottom edges. At the junction of each of the panels 14, 15, 16, 17 there is a crease 34 bent to form a hinge. The panels may be folded to form either a flat loop approximately twice the size of pages 26 and 27 of the book as in FIGURE 1 or arranged to form a box-like structure as in FIGURE 4, or folded over to form a collapsed loop as in FIGURE 3. FIGURE 7 shows the flat loop as a flexible masking loop.

In panel 14 apertures 21, 22 and 24 are cut. Apertures 21 and 24 and the upper half of 22 may have cellophane or similar transparent material placed within them so as to form windows. When the panels are laid out as in FIGURE 1, panel 17 is in the flat tubular channel 13 and as the mask slide is pulled, panel 16 follows 17 into the channel 13. Both 16 and 17 fit into the channel and give guidance to panel 14 as 16 and 17 are pulled down or pushed up in the channel 13. Tab 18 may be grasped to pull the masks. The panel which fits in channel 13 must conform in size to fit the channel, but it does not need to be of any particular size. In fact, panels 15 and 16 may be smaller and need not be joined to each other. If panels 17 and 14 are of quite flexible material as shown in FIGURE 7, the loop may be further shortened so that the bottom of 14 feeds into channel 13 and panel 17 replaces the masking material at the top of 14 as panel 14 is pulled down.

Pages of the programmed material 26, 27 may be fastened in the cover panels 10 and 11 at 29', 30 by staples, stitching or other means, usual in book binding, along the crease 28—28. The material 26, 27 may be bound to a cardboard back which in turn may have tongues 31, 32 which would fit in slots $31^1$, $32^1$, in the panels 10 or 12. Other means used in book binding may be used to secure the programmed material within the cover. This may include rings or plastic fasteners.

The programmed material is in the usual form of properly worded questions. Each question, such as at 21, is written, formed and located on the positioned page 26 so that it may be seen through aperture 21. Each question of the programmed material is written above another so that they form a column below 21 and at the left of the sheet 26 so that the questions will each appear in the aperture 21 of the slidable mask panel 14 as it is pulled by the tab 18. The printed space for the question is not larger than the aperture 21. On the right of the sheet of the programmed material 26 is a surface 23 for writing responses. Each response to programmed material is brief and should take up only the lower half of the space uncovered by the aperture 22. The upper part of the aperture may have transparent material 29 in it to keep the student from writing in that part of the aperture. This writing surface at 23 may be detachable as by perforated strip or added temporarily by an adhesive such as pressure sensitive gums, or there may be a margin 23¹ as a tablet fastened to the panels 11 and 12. A slate or a surface which may be cleaned may be employed for writing the responses. In fact, carbon paper may be placed under the place designated by numeral 40 for the response and a marking device recording on the response tab 23 may be employed as a means for discouraging and detecting cheating.

Between 21 and 22 there is the aperture 24 large enough to show the correct answer to the programmed question in column 25. The answer may be written in color such as blue for true. It is usually located opposite the lower part of the question aperture 21. There can be an indicator 20 and marked stops 19, 35, 36 either at the left edge of the sliding mask or marks such as 37, 38, 39 to appear in one of the apertures 21, 22 or 24 so that as the mask slide is pulled toward the student he can see that he should stop and respond to the question shown at 21.

The questions of the programmed material thus show at 21 when the page 26 is under the mask panel 14. When the page is turned (to the left) the page of next questions and answers remains substantially hidden from the student by the mask panels 14 and 15. When the page is turned the programmed material is turned face down. Instructional material may be written for study on the reverse side of the page. I suggest that the instructional material which lies opposite as shown at 27 should correspond to and precede the programmed questions as on page 26. Thus a student would read completely the material at the left as in a book and then read and respond at 22 to the respective questions of the programmed material as they appear in sequence in 21.

When the device is not in use the slide of mask panels 14, 15, 16, 17 is pushed up or away from the student, the panels 15 and 16 are folded down about the crease between 14 and 15 as shown in FIGURE 3, and the cover 10 is folded over closing the device as one would close a book.

When a student uses the device, it should be laid on a flat surface such as a desk or table as one would lay a book, the fold or the back of the book to the left. Panel 10 is opened to the left like the cover of a book to the position shown in FIGURE 3.

Instructional material and directions may be evident in written form on the inside of the cover 10. Panels 15 and 16 will be raised up and folded out as in FIGURE 1, away from the student and laid on the flat surface. It is suggested that the first page of instructional material 27 be turned to the left. This is done by raising panel 15 from the flat surface keeping the panel parallel to the top of the desk as in FIGURE 4. This leaves ample room for turning the page 27 and leaves the page 26 of the programmed material under panel 14 so that instructional material is on the left and the programmed questions are on the right. The panel 14 is pushed away from the student and falls flat as in FIGURE 1. A programmed question is shown in aperture 21. A marked response is made in 22 avoiding the upper part of the aperture. Now the tab 18 is grasped with the right hand and the left hand grasps the cover panel 10, preferably at the top. Tab 18 is pulled toward the operator until indicator 20 is opposite marker 19 or marker 39 appears in the aperture 24. The answer preferably in a blue rectangle shows in 24. After this answer is read and compared with response showing in aperture 29 the tab 18 is pulled further until a stop mark 37 shows through 21 or a mark 35 is reached by indicator 20. After this is done the procedure is repeated. When the slide mask panel 14 reaches the bottom of the page the panel is pulled or pushed as far as it will go away from the student and sheet 15 is raised to its position in FIGURE 4 and the page of programmed material is turned over to the left. This exposes another page of instructional material on the left. A set of new programmed questions is positioned on the right so that when the mask is dropped down, as previously described, the procedure may be continued.

I claim:

An educational device comprising a cover member consisting of two panels hingedly joined together, one of said panels having a guide channel, a slide mask member consisting of four panels hingedly joined together to form a loop slidably mounted in said guide channel, programmed educational material in the form of a book having pages of preselected length and width supported on said two panels with a given question and answer portion of the material on the guide channel and in the loop, at least two opposed panels of said four panels having a length and a width greater than the length and the width of the pages of the programmed material whereby the four panels can be moved about the hinges to form an open ended box of a height at least equal to the width of the page to allow the page to be turned from a position in the loop to a position overlaying the other of said two panels, aperture means in one of said two opposed panels located to provide a view of the question of the programmed material when the four panels are moved about the hinges to form a flat closed loop in a first position, to provide a view of the answer when the loop is slid in the channel to a second position, and to provide access to the material for recording the answer to the question when the loop is in the first position and a window covered by a transparent material adjacent the access portion of the aperture means for viewing the recorded answer when the loop is in the second position.

References Cited by the Examiner

UNITED STATES PATENTS

| | | | |
|---|---|---|---|
| 619,532 | 2/99 | Bateman | 281—15 |
| 1,490,934 | 4/24 | McDade | 35—48.11 |
| 1,666,337 | 4/28 | McDade | 35—75 |
| 2,193,048 | 3/40 | Vander Velde | 35—35.5 |
| 2,493,668 | 1/50 | Gonzales | 35—35.5 |
| 3,046,675 | 7/62 | Schure | 35—9 |
| 3,054,195 | 9/62 | Palmer | 35—9 |

FOREIGN PATENTS 408,389  1/25  Germany.

JEROME SCHNALL, *Primary Examiner.*

ABRAHAM BERLIN, LAWRENCE CHARLES,
*Examiners.*